2,786,062

PERCHLOROCYCLOPENTENES IN CHLORINATING REACTIONS

Heinrich Vollmann, Leverkusen-Wiesdorf, Germany, assignor to Farbenfabriken Bayer Aktiengesellschaft, Leverkusen, Germany, a corporation of Germany No Drawing. Application February 10, 1953, Serial No. 336,204

Claims priority, application Germany February 13, 1952

5 Claims. (Cl. 260—314.5)

The present invention relates to chlorinating reactions. According to the hitherto known processes the halogenation of difficultly soluble dyestuffs is effected either in inorganic suspensions or solvents, such as water, sulfuric acid or chlorosulfonic acid, or in organic solvents which are resistant to halogens. If these inorganic solvents are not applicable for the reason that undesired oxidation or sulfonation reactions occur, and if for obtaining the desired stage of halogenation high temperatures are necessary, as for instance during the perchlorination of phthalocyanine dyestuffs, the higtherto known solvents are unsatisfactory.

In accordance with the present invention it was found that the organic perchloro compounds of the cyclopentene- and the indan series are excellent auxiliary agents for effecting chlorinating reactions even under energetic conditions. The perchloro compounds free from hydrogen represented by Formulae I and III, the octachlorocyclopentene (I), the perchloroindan (=decachloroindan, perchlorohydrinden III) respectively, are suitable compounds with regard to their resistance to chlorine within a temperature range up to about 300° C., even in the presence of chlorinating catalysts, such as iron chloride, etc. Furthermore they are excellent solvents, liquid or readily fusible and difficultly volatile. Besides the two compounds can be obtained in a technically simple and economic manner.

It was also found that octachlorocyclopentene (I), and in particular perchloroindan (III) are not only suitable solvents for effecting energetic chlorinating reactions, but that these two compounds themselves act as chlorinating agent at higher temperatures.

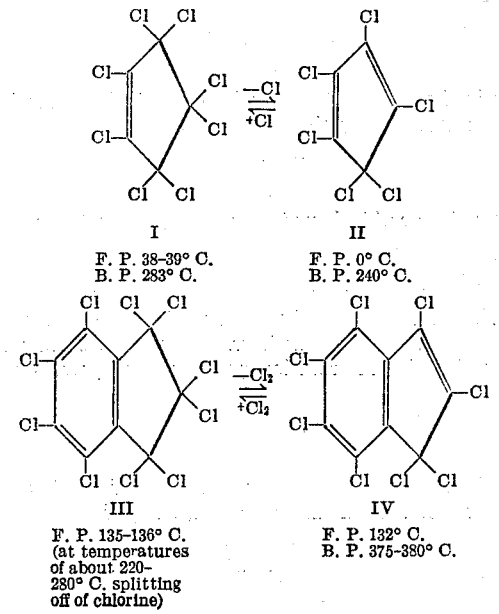

I
F. P. 38-39° C.
B. P. 283° C.

II
F. P. 0° C.
B. P. 240° C.

III
F. P. 135-136° C.
(at temperatures of about 220-280° C. splitting off of chlorine)

IV
F. P. 132° C.
B. P. 375-380° C.

Perchloroindan (III) when heated to about 220–280° C. splits off one mol of chlorine and is converted into perchloroindene (IV) almost quantitatively. When heating perchloroindan (III) together with copper phthalocyanine in at least the theoretically required proportions, an exhaustively chlorinated copper phthalocyanine containing 15–16 atmos of chlorine in the molecule is obtained within a few minutes.

The surprisingly high speed of this perchlorinating reaction may be due to the specific activity of the chlorine in its nascent state, as well as to the solvent power of a melt of III and a mixture of III and IV at high temperatures.

The perchloroindene (IV) formed during this kind of chlorination melts at 133° C. in pure form (according to Th. Zincke, Ann. 272, 270 (1892), melting point=82° C.); it may quantitatively be re-converted into perchloroindan (III) (melting at 135–136° C.) in the presence of a small quantity of iron chloride by adding chlorine at a temperature below about 200° C. Mixtures from (III) and (IV) show a considerable depression of the melting point.

Between the compounds of (III) and (IV) an equilibrium is formed which depends on the temperature and the quantity of free chlorine used. In certain temperature ranges—between about 200° and 300° C. the compound (III) may therefore also be considered as organic chlorine carrier. The same process as illustrated in (III) and (IV) is also, on principle, illustrated in system I and II. It is true that compound I, as is known, hardly splits off chlorine, even if boiled for a longer time (boiling point at about 280° C.), and conversion from I into II normally takes place at temperatures ranging from 470–480° C. at a speed worthwhile mentioning (Krynitzky and Bost, Journal Am. Chem. Soc. 69, 1918 (1947)). But if according to the present invention a chlorinatable compound is present, I is converted into II at the boiling temperature while splitting off chlorine.

Hereby an exhaustive chlorination of copper phthalocyanine is possible in the presence of catalysts without the addition of free chlorine. The compound II formed is again reconverted by addition of chlorine into I, either during chlorination of the copper phthalocyanine or subsequently in the filtrate of the chlorinated dyestuff which contains mostly a mixture of I and II.

In the present specification and in the examples in particular perchlorination of phtalocyanines is described in order to set forth that the auxiliary agents used are suitable even under most energetic conditions. These auxiliary agents are naturally not only suitable for the chlorination of phthalocyanines but may also be used for the manufacture of other chlorination products, as long as the latter are readily separable from the solvents or chlorinating agents used, because of their more difficult solubility or higher volatility.

The compounds of types I–IV are obtainable from cheap raw materials in a technically simple manner. Octachlorocyclopentene I is, for instance, obtainable from aliphatic hydrocarbons containing at least one $C_5$-chain by chlorination (McBee, Ind. Engin. Chem. 33, 181 (1941)) or by reacting trichloroethylene with carbon tetra chloride (H. J. Prins, Recueil 69, 1006 (1950)). Perchloroindan III may be obtained from perchlorinated naphthalene by splitting off carbon tetra chloride in a yield exceeding 90% of the theoretical (reaction acc. to Schwemberger and Gordon, Journ. obschteschej chimiji 8, 1353 (1938); Zentralblatt 1939, II, 3690, and application Serial No. 336,205, filed February 10, 1953.)

When using compounds of type I and II, III and IV resp., these need not be present in the pure state. Also the crude products which are obtained during the manufacture (see Examples 2 and 4) may be used.

The invention is further illustrated by the following examples without being restricted thereto:

Example 1

75 parts by weight of finely divided copper phthalocyanine are added to 1200 parts by weight (equal to 700 parts by volume) of melted perchloroindan, with stirring. After the addition of 2 parts by weight of iron chloride the temperature is raised to 200–300° C. The mixture is stirred until perchlorination of the dyestuff is completed which can be detected from the color when dissolving a test portion in chlorosulfonic acid. The test portion is diluted with chlorosulfonic acid, sucked off and washed with benzene. As the reaction proceeds the color of the solution of the starting product turns over intermediate stages from yellow-olive finally into bluish-red. Perchlorination of the dyestuff is completed as soon as the color of the solution is the same as that of a standard solution. The time required for effecting perchlorination merely depends on the temperature. At a temperature of 200° C. perchlorination will take 12 hours, at 300° C. about 30 minutes and at higher temperatures (up to the boiling point of the perchloroindene formed) only about 5–8 minutes.

For purification the mixture is diluted with 750 parts by weight of chlorobenzene at about 140° C. It is filtered with suction while hot and washed with chlorobenzene. The clear-green perchloro dyestuff is boiled with dilute hydrochloric acid. 137 parts by weight of a loose, green powder, equal to 97% of the theoretical, calculated upon hexadecachloro copper phthalocyanine are obtained.

The filtrate is freed from chlorobenzene under decreased pressure then with stirring and, if necessary, after adding 0.05% of iron powder, it is treated with chlorine at a temperature of 180–200° C. until all perchloroindene has been converted into perchloroindan. Completion of this reaction is detectable from the crystallizing power of a test portion taken, or from the color of the solutions in chlorosulfonic acid. Perchloroindene IV yields a fuchsine-red solution in chlorosulfonic acid, perchloroindan dissolves with light greenish-yellow coloration. Since no gas is evolved during this reaction it suffices to exert an only slight pressure on the chlorinating vessel and stir the mixture until all chlorine has been added. The perchloroindan regenerated in this manner can be used for a new batch. Even if the chlorinating agent was used five times the dyestuff was obtained in the same good yield.

Instead of diluting copper phthalocyanine with chlorobenzene after chlorination is completed, the largest part of the perchloroindene may also be removed by vacuum distillation (boiling under 12 mm. pressure at about 240° C.). If necessary, this product may be purified in the same manner.

Example 2

In a melt of 1200 parts by weight of crude perchloroindan containing iron chloride, 75 parts by weight of finely divided copper phthalocyanine are reacted with chlorine, with stirring, until perchlorination of the dyestuff is completed. If during this reaction a temperature of 220° C. is not much exceeded, only small quantities of perchloroindene are formed. The melt can directly be filtered with suction over a steam heated filter. The filtrate may be used for further batches. The dyestuff which remains on the suction filter is washed with a solvent suitable for that purpose. The yield obtained and quality of the product are the same as indicated in Example 1.

Example 3

115 parts by weight of copper phthalocyanine and 2 parts by weight of iron chloride are heated to boiling under reflux and stirred into 2000 parts by weight of octachlorocyclopentene. It takes about 4 to 8 hours until the copper phthalocyanine is completely chlorinated, which is detectable from the color of the solution in chlorosulfonic acid as indicated in Example 1. The mixture is cooled to 40–50° C., filtered with suction and the crystallized perchloro copper phthalocyanine is washed with carbon tetrachloride. 210–212 parts by weight of the product are obtained after drying.

The filtrate consists of a mixture containing a preponderant quantity of hexachlorocyclopentadiene with unchanged octachlorocyclopentene. If desired, the components may be separated by fractional distillation. When adding chlorine at 180–220° C. and in the presence of iron chloride the mixture is converted into octachlorocyclopentene and may be used for further batches without further distillation.

Example 4

10.25 parts by weight of phthalocyanine which is free from metal are heated to boiling under reflux for about 20 hours together with 200 parts by weight of crude octachlorocyclopentene to which 0.3 part by weight of anhydrous iron chloride are added, with stirring. After filtering with suction, washing with carbon tetrachloride and boiling with dilute hydrochloric acid 17.5 to 18.5 parts by weight of chlorinated phthalocyanine containing 47.5 to 48.5% of chlorine are obtained.

The crude octachlorocyclopentene used for effecting chlorination was obtained as follows:

3.85 parts by weight of carbon tetrachloride are heated to boiling under reflux and stirred together with 0.225 part by weight of anhydrous aluminium chloride. During 7 hours the mixture is gradually reacted with 1.315 parts by weight of trichloroethylene. After boiling for a further hour the mixture is extracted with dilute hydrochloric acid to which a small amount of ice is added, and washed with water twice. The excess of carbon tetrachloride is distilled off. Then about 0.17 part by weight are distilled off at 140° C. under 10 mm. pressure. The remaining light oil, about 1.4 parts by weight, consists of octachlorocyclopentene containing about 15% of trichloroethenylheptachlorocyclopentene.

Example 5

When working according to the methods indicated in Example 3 or 4 while adding chlorine, chlorination takes place in the same manner, only more rapidly. The filtrate consists of the unchanged octachlorocyclopentene which may be used without further purification for a continuous series of such chlorinating batches. If necessary, the filtrates may be purified by vacuum distillation.

I claim:

1. The process for chlorinating phthalocyanines which comprises using under anhydrous conditions as chlorinating agent and as a solvent perchloro compounds containing a

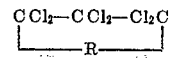

group in their molecule, wherein R stands for a bivalent radical selected from the group consisting of a

group and a perchlorinated o-phenylene radical at a temperature from about 200° C. to the boiling point of said chlorinating agent.

2. The process for chlorinating phthalocyanines which comprises using under anhydrous conditions as chlorinating agent and as a solvent in the presence of a chlorination catalyst for the reaction perchloro compounds containing a

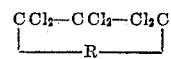

group in their molecule wherein R stands for a bivalent radical selected from the group consisting of a

group and a perchlorinated o-phenylene radical at a temperature from about 200° C. to the boiling point of said chlorinating agent.

3. The process for chlorinating phthalocyanines which comprises using under anhydrous conditions as chlorinating agent and as a solvent in the presence of a chlorination catalyst for the reaction a mixture of perchloro compounds containing a

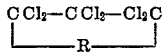

group in their molecule, wherein R stands for a bivalent radical selected from the group consisting of a

group, and a perchlorinated o-phenylene radical, and perchloro compounds containing a

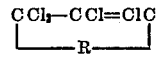

group in their molecule, wherein R stands for a bivalent radical selected from the group consisting of a

group and a perchlorinated o-phenylene radical, introducing simultaneously chlorine for converting said present

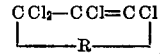

component into said

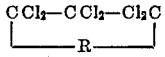

component at a temperature from about 200° C. to the boiling point of said chlorinating agent.

4. The process for chlorinating phthalocyanines which comprises heating phthalocyanines with perchloroindan in the presence of a catalytical amount of iron chloride at temperatures from about 200° C. to the boiling point of the perchloroindane.

5. The process for chlorinating phthalocyanines which comprises heating phthalocyanines with octachlorocyclopentene in the presence of a catalytical amount of iron chloride at temperatures from about 200° C. to the boiling point of the octachlorocyclopentene.

References Cited in the file of this patent

UNITED STATES PATENTS 2,377,685    Fox et al. _____ June 5, 1945
2,716,140    McBee et al. _____ Aug. 23, 1955

OTHER REFERENCES

Krynitsky et al.: J. Am. Chem. Soc., vol. 69, pp. 1918–20 (1947).